US006978078B2

(12) United States Patent
Wood

(10) Patent No.: US 6,978,078 B2
(45) Date of Patent: Dec. 20, 2005

(54) REDUCED CLAD DIAMETER RARE EARTH DOPED FIBER COILS AND OPTICAL AMPLIFIERS UTILIZING SUCH COILS

(75) Inventor: William A Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 16 days.

(21) Appl. No.: 10/755,009

(22) Filed: Jan. 8, 2004

(65) Prior Publication Data

US 2005/0152662 A1    Jul. 14, 2005

(51) Int. Cl.[7] ................................................ G02B 6/16
(52) U.S. Cl. ...................................... 385/142; 385/123
(58) Field of Search ................................ 385/141, 142, 385/144, 123, 126, 127, 37; 359/337, 337.4, 359/341.1, 345, 341.3, 341.33, 341.5; 65/390; 501/37

(56) References Cited

U.S. PATENT DOCUMENTS

| 5,185,749 | A | * | 2/1993 | Kalman et al. ................ 372/6 |
| 6,434,295 | B1 | | 8/2002 | MacCormack et al. ....... 385/27 |
| 6,480,659 | B1 | | 11/2002 | Patlakh et al. .............. 385/125 |
| 6,496,301 | B1 | | 12/2002 | Koplow et al. ............. 359/337 |
| 6,556,346 | B1 | * | 4/2003 | Di Pasquale et al. .... 359/341.5 |
| 6,771,865 | B2 | * | 8/2004 | Blaszyk et al. ............. 385/127 |
| 6,810,185 | B2 | * | 10/2004 | Qi et al. ..................... 385/127 |
| 2003/0011876 | A1 | | 1/2003 | Fidric ....................... 359/337.4 |
| 2003/0142940 | A1 | * | 7/2003 | Qi et al. ..................... 385/127 |

FOREIGN PATENT DOCUMENTS

| EP | 0 442 553 A1 | 8/1991 | |
| EP | 0 637 762 A1 | 2/1995 | |
| WO | WO 00/43816 | 7/2000 | |
| WO | WO 02/101889 A2 | 12/2002 | |
| WO | WO 03/012489 A2 | 2/2003 | |
| WO | WO 2004/095655 | * 11/2004 | ............. H01S 3/67 |

OTHER PUBLICATIONS

Schnoes, Melinda G., et al; Photopolymer-filled nanoporous glass as a dimensionally stable holographic recording medium; Optics Letters vol. 24, No. 10 dated May 15, 1990.

* cited by examiner

Primary Examiner—Frank G. Font
Assistant Examiner—James P. Hughes
(74) Attorney, Agent, or Firm—Svetlana Z. Short

(57) ABSTRACT

According to the present invention, a rare earth doped fiber coil comprises a rare earth doped optical fiber having a rare-earth doped core surrounded by a cladding. The outer clad diameter is less than 100 $\mu$m. The rare earth doped optical fiber has a length of 10 m to 50 m and is coiled with a bend radius of less than 40 mm.

14 Claims, 5 Drawing Sheets

REDUCED CLAD DIAMETER RARE EARTH DOPED FIBER COILS AND OPTICAL AMPLIFIERS UTILIZING SUCH COILS

BACKGROUND OF THE INVENTION

1. Field of the Invention

The present invention relates generally to optical rare-earth doped fibers with small clad diameters and, more specifically, to coiled or bent optical rare-earth doped fibers with small clad diameters.

2. Technical Background

Rare earth doped optical fibers are commonly utilized in optical amplifiers. An example of optical amplifier is an erbium doped optical fiber amplifier (EDFA). A typical erbium doped fiber has an outer clad diameter of 125 µm. When this type of fiber is coiled such that bend radius is small (35 mm or smaller), the fiber coils suffer from bend-induced birefringence. The tighter (smaller) the bend radius, the higher the amount of bend-induced birefringence. More specifically, the bend-induced birefringence is inversely proportional to the square of the bend radius. The bend induced birefringence results in Differential Group Delay or DGD. As illustrated in FIG. 1, the smaller the bend radius, the greater the DGD. That is, due to bend-induced birefringence one polarization component of the optical signal propagates through the fiber faster than the other polarization component. As a result, because Polarization Mode Dispersion or PMD is the average of DGD values over the wavelength band, the bend induced birefringence also results in increased PMD. This is especially problematic in high data rate amplifiers because PMD broadens the signal pulse width, thereby limiting the error-free bit rate of a fiber optic transmission system. Thus, DGD and PMD are limiting factors that prevent utilization of smaller coil diameters in high data rate optical amplifiers.

SUMMARY OF THE INVENTION

According to the present invention, a rare earth doped fiber coil comprises a rare earth doped optical fiber having a rare-earth doped core surrounded by a cladding. The outer clad diameter is less than 100 µm. The rare earth doped optical fiber has a length of 10 m to 50 m and is coiled with a bend radius of less than 40 mm.

According to one embodiment, the rare earth doped optical fiber is an Er doped optical fiber.

According to one embodiment, the bend radius is between 8 mm and 20 mm.

According to one embodiment, the outer clad diameter is between 70 µm and 95 µm.

One advantage of the present invention is that the coiled optical fiber exhibits reduced DGD and PMD while utilizing lesser amount of glass to manufacture. Furthermore, the same length fiber may be packaged in a smaller volume, thus reducing the overall size of optical amplifiers. Consequently, the present invention may be utilized, for example, to manufacture optical amplifiers in significantly smaller packages or with ultra-low PMD.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
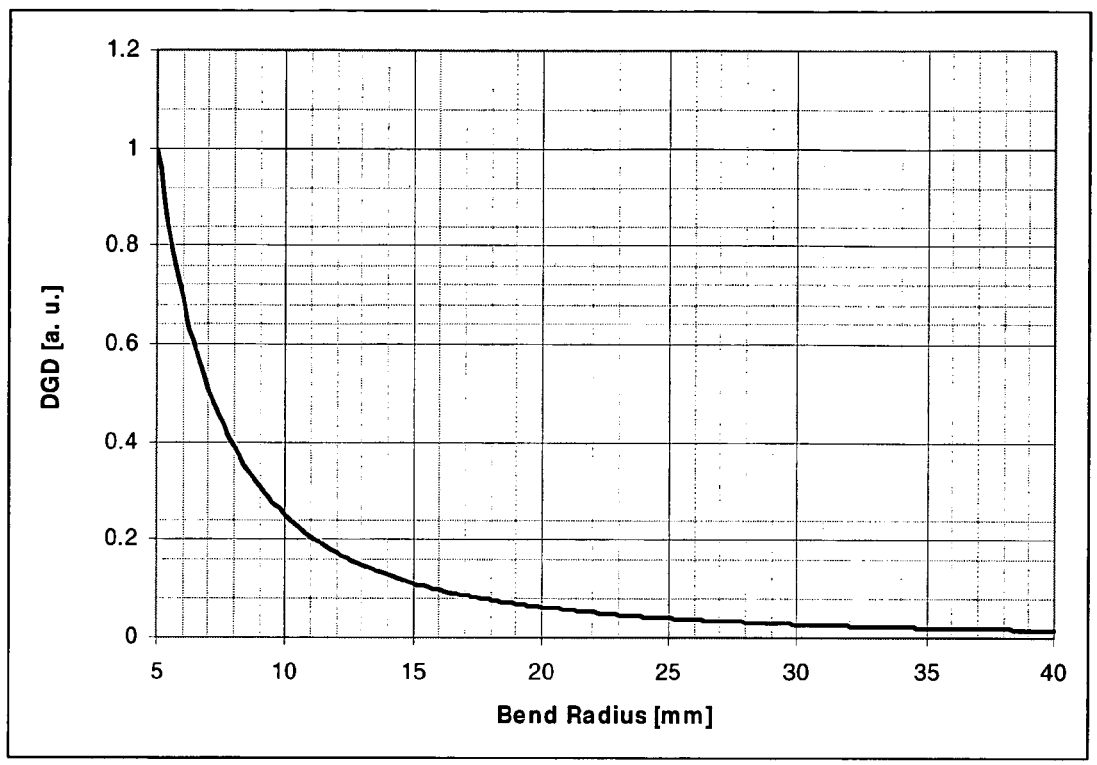
FIG. 1 is an illustration of differential group delay DGD dependence on bend radius R.

Reference will now be made in detail to the present preferred embodiments of the invention, examples of which are illustrated in the accompanying drawings. Whenever possible, the same reference numerals will be used throughout the drawings to refer to the same or like parts.

Figure 2:
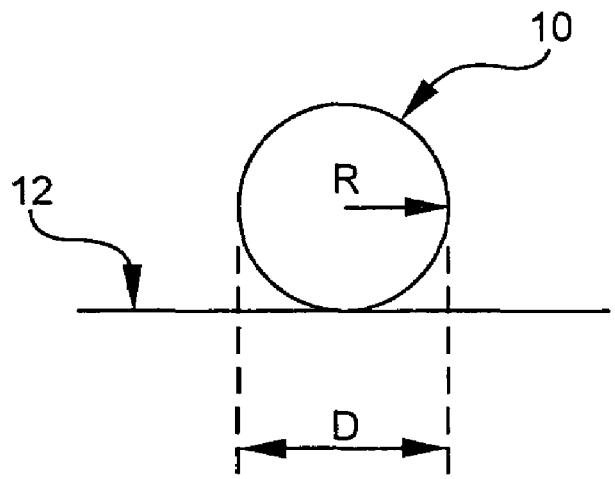
FIG. 2 is a view of one embodiment of the present invention.

One embodiment of the reduced clad diameter rare earth doped fiber coil of the present invention is shown in FIG. 2, and is designated generally throughout by the reference numeral 10. The fiber coil 10 has a bend radius (illustrated as coil radius R) of less than 40 mm. It is preferable, in order to be more compact while maintaining minimal PMD effects due to birefringence, that the bend radius R be between 8 mm and 35 mm, more preferably between 8 mm and 20 mm and most preferably between 10 mm and 15 mm. However, if the bend radius R becomes too small (i.e. less than 5 mm), then fiber bend loss increases and, even more importantly, fiber reliability may suffer, i.e. fiber life span may be shortened.

Figure 3:
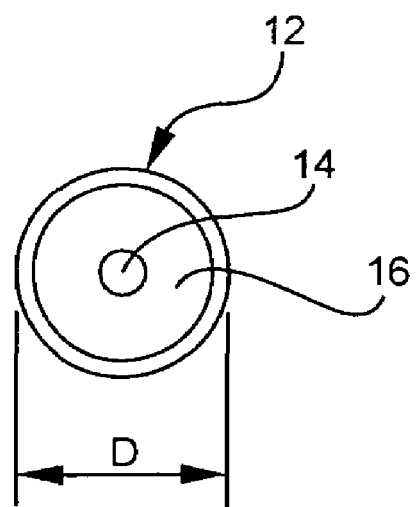
FIG. 3 is a cross-sectional view of the optical fiber illustrated in FIG. 2.

As embodied herein and depicted in FIG. 3, this fiber coil 10 comprises a rare earth doped optical fiber 12 having a rare-earth doped core 14 surrounded by a cladding 16 with outer clad diameter d of less than 100 µm. It is preferable that the outer clad diameter d be in the range of 70 µm to 95 µm, more preferably in the range of 72 µm to 90 µm, and even more preferably in the range of 75 µm to 85 µm. The rare earth doped optical fiber has a length L of 10 m to 50 m and, when utilized in optical amplifiers, it is often preferred that its length be in the 10 to 30 m range. If the outer clad diameter d becomes too small (i.e., less then 70 µm), the fiber may become more difficult to handle, less strong and more sensitive to perturbations such as microbending.

Bend induced birefringence, DGD and PMD are all proportional to the square of the outer clad diameter d. Therefore, a reduction in a size of outer clad diameter from 125 µm to 80 µm should result in $(80/125)^2 = 0.41 \times PMD$ of the identical composition fiber with a 125 µm outer diameter, or a 59% reduction in PMD. Similarly, a 90 µm outer clad diameter should have only 0.52×PMD of the identical composition fiber with a 125 μm outer diameter, or a 48% reduction in PMD.

Figure 4:
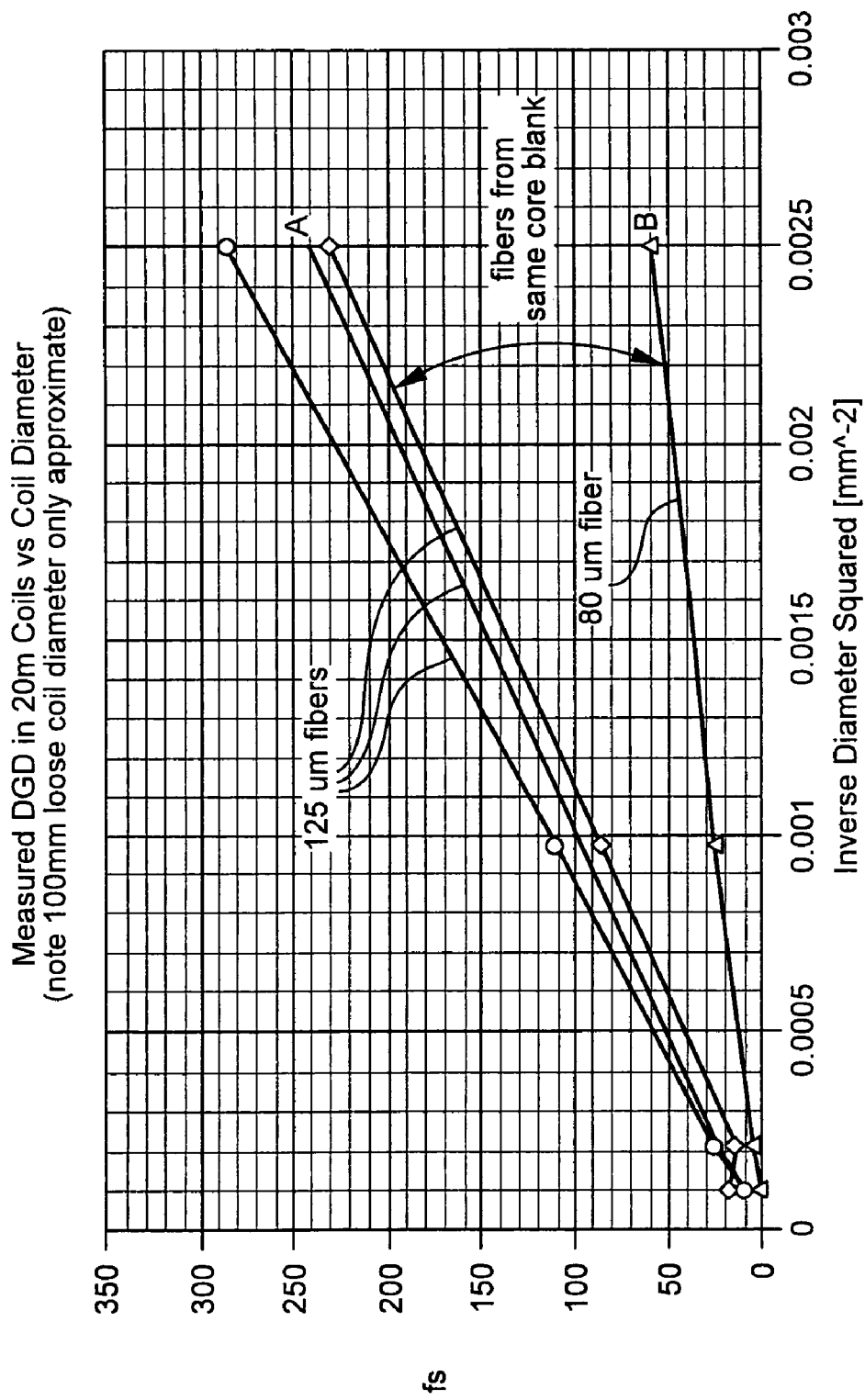
FIG. 4 illustrates the relationship between DGD and the outer clad diameter of two optical fibers with identical compositions.

FIG. 4 illustrates the relationship between DGD and the outer clad diameter of two exemplary optical fibers. Specifically, the vertical axis of FIG. 4 represents DGD (measured in fs). The horizontal axis is an inverse square of the fiber's outer clad diameter ($1/d^2$), in units of $mm^{-2}$. These measurements shown in FIG. 4 were performed using 20 m long fiber coils of various radii R. In these measurements, coil radii R were between 5 mm and 10 mm. Results for a rare earth doped fiber (Er doped fiber) with an outer clad diameter d=125 μm is denoted by line A. Another rare earth doped fiber with identical composition, but reduced clad diameter d=80 μm is denoted by line B. FIG. 4 clearly shows that fiber B suffers from much smaller amount of DGD than fiber A. The reduction in PMD is approximately consistent with the above calculation.

Figure 5:
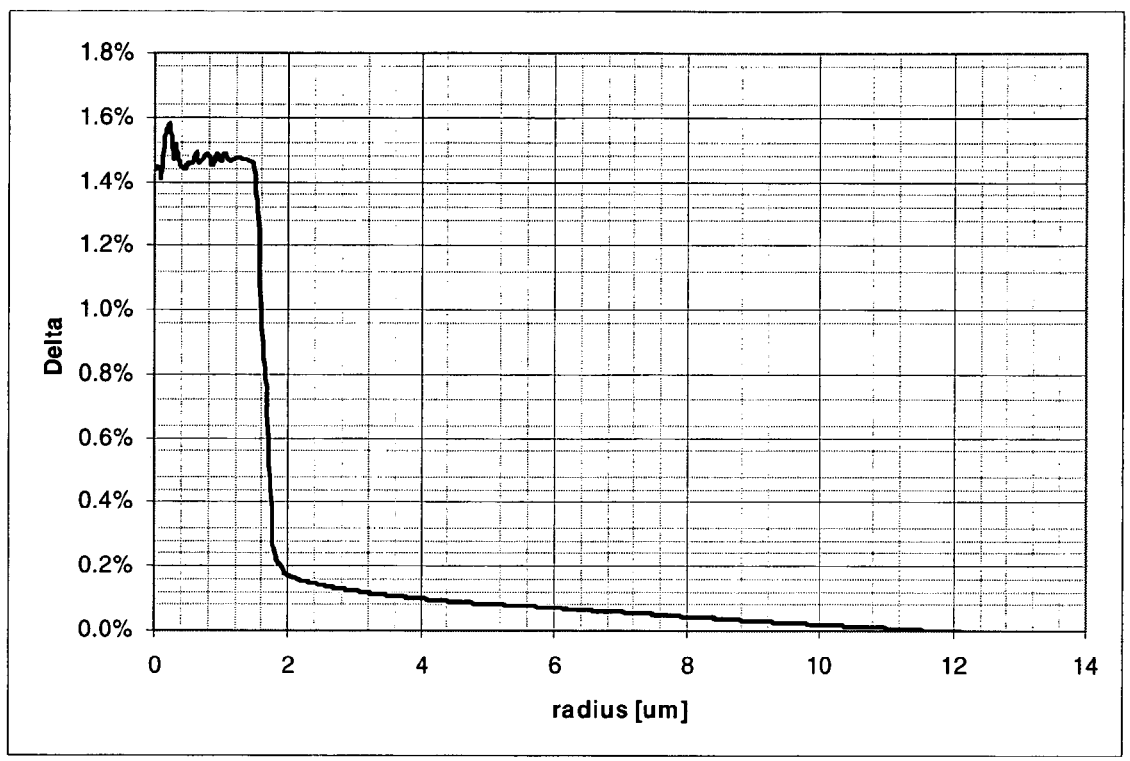
FIG. 5 illustrates fiber profile of an exemplary rare earth doped fiber.

The exemplary fibers A and B have the following core composition: 8.6 wt % $Al_2O_3$, 13.6 wt % $GeO_2$, 700 wtppm $Er_2O_3$. The fiber profile is illustrated in FIG. 5. The claddings of these fibers is made of silica.

However, because DGD and PMD are proportional to a square of the fiber's outer clad diameter, as shown above, then regardless of fiber's composition, a reduction in the clad diameter of any coiled rare-earth doped optical fiber will result in better DGD, PMD and smaller package volume. The latter attribute is especially useful for reducing the overall size of optical amplifiers.

Figure 6:
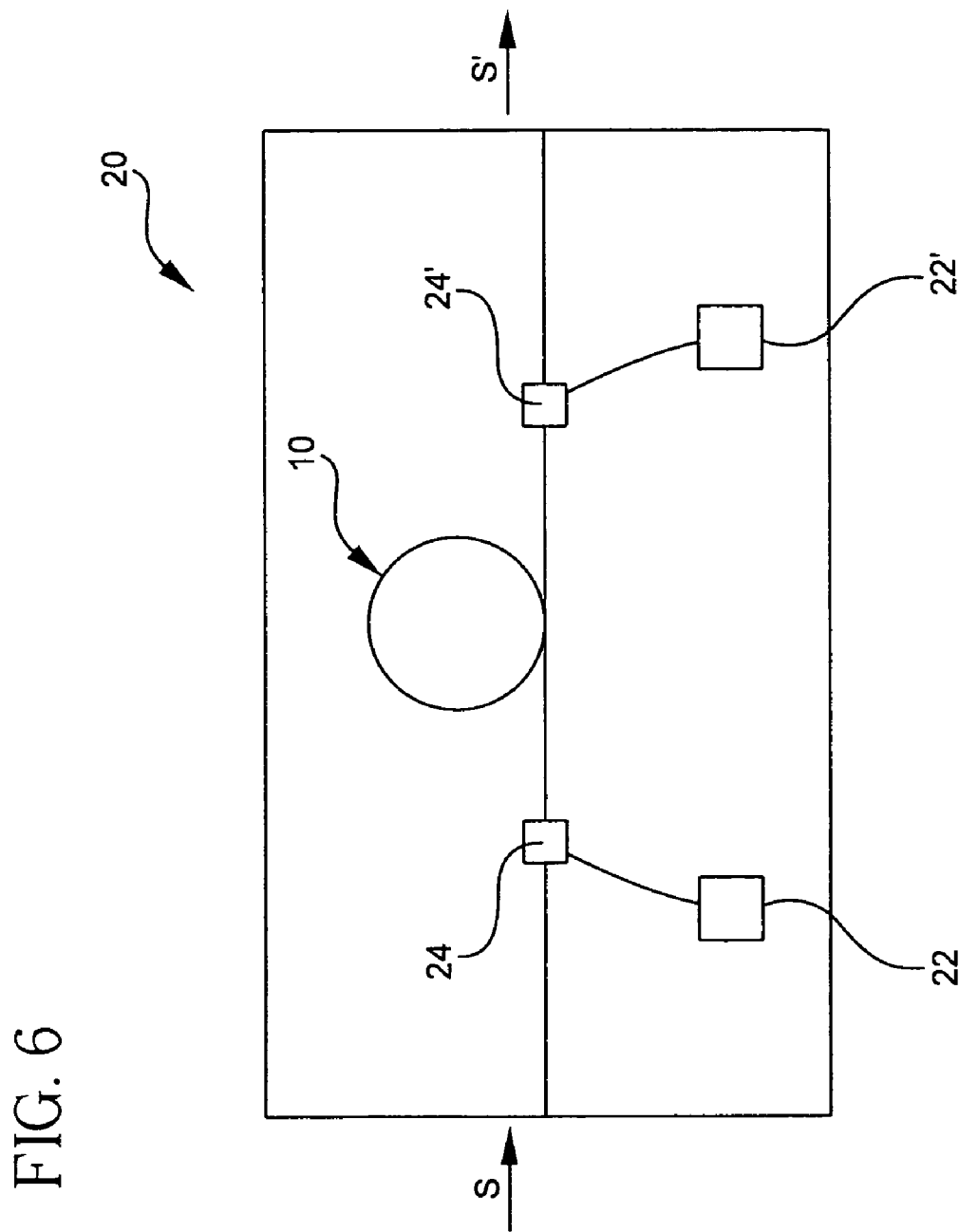
FIG. 6 is a schematic of an optical amplifier that utilizes the fiber coil depicted in FIG. 2.

As embodied herein and depicted in FIG. 6, an optical amplifier 20 may utilize rare earth doped fiber coil 10 as its amplification medium. In this exemplary amplifier, coil 10 is pumped by the pump source 22 (laser diode, for example) that is coupled to the rare-earth doped fiber 12 by an optical coupler 24. The optical coupler 24 provides both incoming optical signal S and the pump light from the pump source 22 to the rare earth doped fiber 12, which amplifies incoming signal S and provides, as an output, the amplified signal S'. Optionally, in order to provide additional pump power, another pump source 22' may also be coupled to the rare-earth doped fiber 12 via an additional optical coupler 24'.

As stated above, the rare earth doped amplifying fiber 12 of coil 10 has a rare earth doped core 14 surrounded by a cladding. The outer clad diameter d is less than 100 μm, preferably less than 95 μm, more preferably 90 μm or less, and most preferably 75 μm to 85 μm. The length of the rare earth doped optical fiber 12 is 10 m to 50 m and the bend radius is less than 40 mm. It is preferred that the bend radius R be 35 mm or less, and more preferably 10 mm to 20 mm.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A rare earth doped fiber coil, said rare earth doped fiber coil comprising:
    a rare earth doped optical fiber having a rare-earth doped core surrounded by a cladding with outer clad diameter of less than 90 μm, said rare earth doped optical fiber having a length of 10 m to 50 m and being coiled with a bend radius of less than 40 mm.

2. The rare earth doped fiber coil according to claim 1, wherein said clad diameter is in the range of 72 μm to 90 μm.

3. The rare earth doped fiber coil according to claim 1, wherein said clad diameter is in the range of 75 μm to 85 μm.

4. The rare earth doped fiber coil according to claim 3, wherein said rare earth doped optical fiber is an Er doped optical fiber.

5. The rare earth doped fiber coil according to claim 4, wherein said bend radius is between 8 mm and 35 mm.

6. The rare earth doped fiber coil according to claim 4, wherein said bend radius is between 8 mm and 20 mm.

7. The rare earth doped fiber coil according to claim 4, wherein said bend radius is between 10 mm and 15 mm.

8. The rare earth doped fiber coil according to claim 1, wherein said bend radius is between 8 mm and 20 mm.

9. The rare earth doped fiber coil according to claim 1, wherein said bend radius is between 10 mm and 15 mm.

10. An optical amplifier comprising: a length of rare earth doped amplifying fiber, said amplifying fiber having a rare-earth doped core surrounded by a cladding with outer clad diameter of less than 90 μm, said rare earth doped optical fiber having a length of 10 m to 50 m and being coiled with a bend radius of less than 40 mm.

11. The optical amplifier according to claim 9, wherein said rare earth doped optical fiber is an Er doped optical fiber.

12. The optical amplifier according to claim 9, wherein said bend radius is between 8 mm and 20 mm.

13. The optical amplifier according to claim 9 wherein said outer clad diameter is between 72 μm and 90 μm.

14. The optical amplifier according to claim 9 wherein said outer clad diameter is between 75 μm and 85 μm.

* * * * *